(No Model.)
2 Sheets—Sheet 1.
J. MOOREHOUSE.
CHUTE FOR DEHORNING CATTLE.
No. 414,068. Patented Oct. 29, 1889.
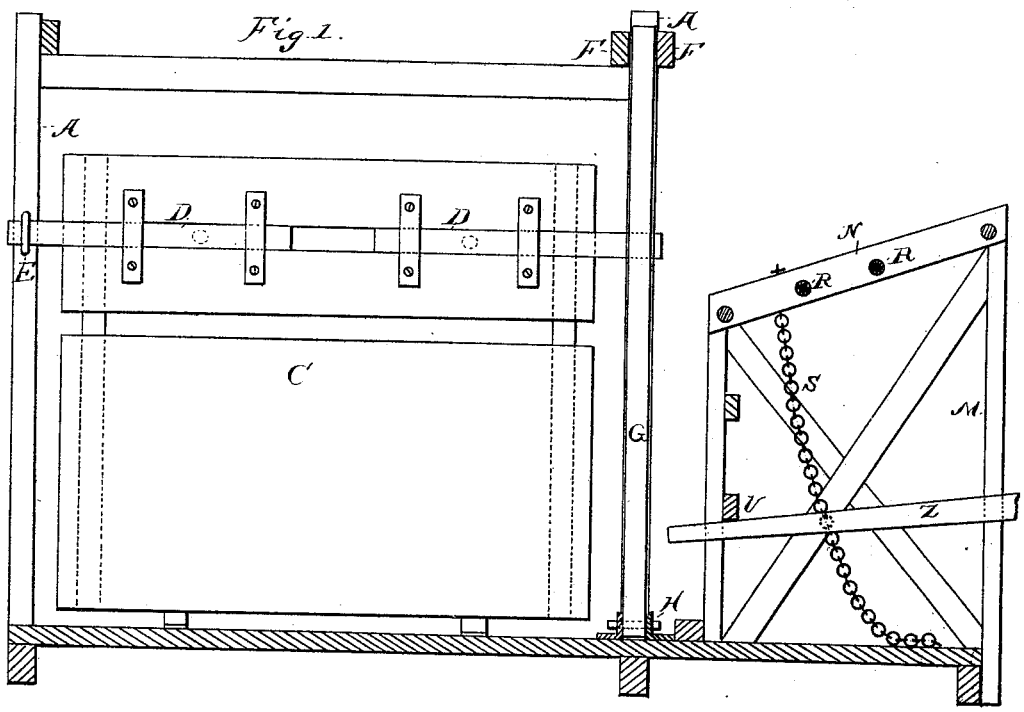
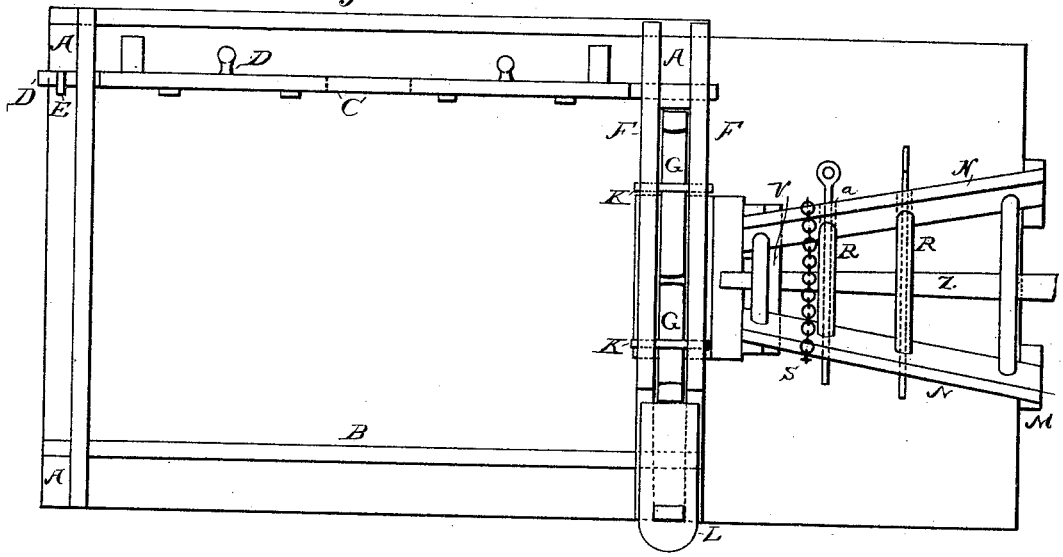
Witnesses
H. J. Ashton
Villette Anderson
Inventor
James Moorehouse
By his Attorney
E. W. Anderson (No Model.) 2 Sheets—Sheet 2.
J. MOOREHOUSE.
CHUTE FOR DEHORNING CATTLE.
No. 414,068. Patented Oct. 29, 1889.
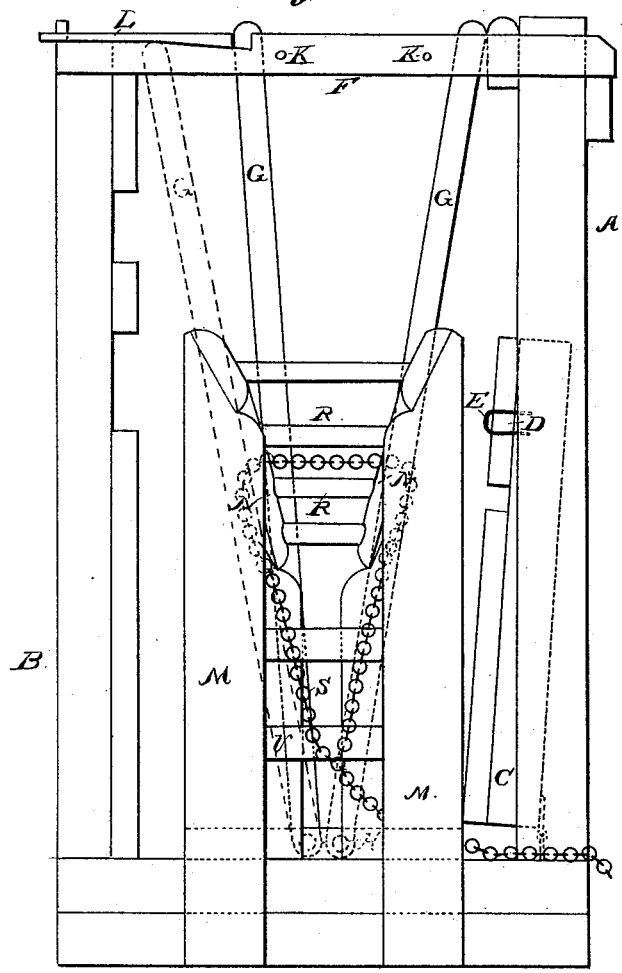
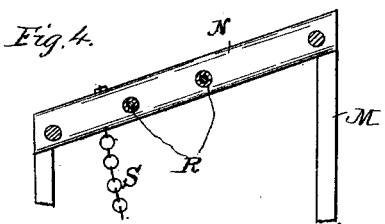
Witnesses
H. F. Ashton,
Villette Anderson.
Inventor
James Moorehouse,
By his Attorney
E. W. Anderson

UNITED STATES PATENT OFFICE.

JAMES MOOREHOUSE, OF CLYDE, KANSAS.

CHUTE FOR DEHORNING CATTLE.

SPECIFICATION forming part of Letters Patent No. 414,068, dated October 29, 1889.

Application filed January 28, 1889. Serial No. 297,847. (No model.)

*To all whom it may concern:*

Be it known that I, JAMES MOOREHOUSE, a citizen of the United States, and a resident of Clyde, in the county of Cloud and State of Kansas, have invented certain new and useful Improvements in Dehorning Cattle-Chute and Head-Holder; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a central longitudinal section of the invention. Fig. 2 is a top view. Fig. 3 is an end view, and Fig. 4 is a detailed view disclosing more especially the cheek-boards N.

This invention has relation to cattle-chutes or stanchions and head-holding devices in connection therewith adapted to hold the heads of cattle firmly while undergoing the dehorning operation; and it consists in the novel construction and combination of parts, as hereinafter set forth.

In the accompanying drawings, the letters A A designate the four posts of the chute, and B the fixed wall on one side. C represents a hinged wall or gate on the other side, said gate being hinged at its lower edge to swing downward and outward between the side posts.

The gate is provided at its upper portion with slide-latches D at its ends, which engage keepers E on the posts and hold the gate in upright position.

The gate is let down to let the animal out of the chute.

The upper ends of the posts at the inner end of the chute or stall are connected by parallel bars F F, between which extend the upper ends of the pivoted upwardly-projecting neck-bars G G. These bars are pivoted to bearings connected to the front of the stall, as at H, and their upper ends are laterally movable beyond the stop-pins K, passed through the bars F. One of the bars G is allowed to swing outward sufficiently to allow the head of an animal to pass through between the bars, and this bar can then be moved up behind the jowl of said animal and secured by a key L, connected to the top of one of the posts.

The head-holding frame or receiver is located just outside of the neck-bars, and consists of strong supports M, carrying the inclined cheek-boards N, diverging gradually outward from their ends next the neck-bars and set in laterally-inclined or flaring position, their lower edges being somewhat nearer to each other than their upper edges, as indicated in the drawings. These cheek-boards are provided with the transverse rest-rods R, which are covered with soft material on their bearing portions between the cheek-boards through openings $a$, in which they are passed. These openings are made in various positions in said cheek-boards, so that the position of the rest-rods may be readily adjusted to suit the size of the head of the animal. A chain S is also employed, and a lever-bar Z.

When the animal passes into the chute and thrusts its head between the neck-bars G G, the movable neck-bar is locked, as hereinbefore mentioned, and the head of the animal, being immediately over the rest-rods R of the cheek-boards N, is readily forced and held down upon said rod by passing the chain S over the animal's head and carried down and looped around the lever Z, which is pressed downward and caught near one end under the bearing V and caught at or near its other end in a notch in the frame.

Having described this invention, what I claim, and desire to secure by Letters Patent, is—

1. The head-holding device for cattle-chutes, consisting of the inclined flaring cheek-boards supported upon a frame and having perforations, the adjustable rest-rods, the fulcrum-bearings, lever, and chain, substantially as specified.

2. The combination, with the cattle-chute having the hinged folding side gate and the pivoted upwardly-extending neck-bars, of the head-holding frame, the inclined flaring cheek-bars supported thereon, and the adjustable rest-rods, substantially as specified.

3. The combination, with a cattle-chute having a side gate, and pivoted neck-bars, of a head-holding receiver, its rest-rods, chain, and lever-bar, substantially as specified.

In testimony whereof I affix my signature in presence of two witnesses.

JAMES MOOREHOUSE.

Witnesses:
A. G. SAXTON,
ANDREW SHRIVER.